(12) United States Patent
Proni et al.

(10) Patent No.: US 6,442,968 B1
(45) Date of Patent: Sep. 3, 2002

(54) APPARATUS FOR RAPID, HIGH VOLUME PRODUCTION OF SOLID $CO_2$ PELLETS

(75) Inventors: Oscar Proni, Hollywood; Marc C. Elias, Miami, both of FL (US)

(73) Assignee: Albert S. Elias, Miami, FL (US)

( * ) Notice: Subject to any disclaimer, the term of this patent is extended or adjusted under 35 U.S.C. 154(b) by 0 days.

(21) Appl. No.: 09/984,376

(22) Filed: Oct. 30, 2001

(51) Int. Cl.[7] ................................................. F25J 1/00
(52) U.S. Cl. ...................................................... 62/605
(58) Field of Search .......................................... 62/605

(56) References Cited

U.S. PATENT DOCUMENTS

| | | | |
|---|---|---|---|
| 3,786,645 A | * | 1/1974 | Cann ............................ 62/605 |
| 3,817,045 A | * | 6/1974 | Muska ......................... 62/605 |
| 4,033,736 A | | 7/1977 | Cann |
| 4,389,820 A | | 6/1983 | Fong et al. |
| 4,977,910 A | | 12/1990 | Miyahara et al. |
| 5,355,962 A | | 10/1994 | Anderson et al. |
| 5,419,138 A | | 5/1995 | Anderson et al. |

\* cited by examiner

*Primary Examiner*—Ronald Capossela
(74) *Attorney, Agent, or Firm*—Jacobson Holman, PLLC

(57) ABSTRACT

A lightweight, highly mobile and efficient apparatus for instantaneously producing a high volume of solid carbon dioxide ($CO_2$) pellets. The apparatus utilizes liquid $CO_2$ that is discharged and expanded through a nozzle or nozzles and expanded to reach a triple point condition where liquid, gaseous and solid phases of $CO_2$ can coexist and flash to a mixture of $CO_2$ in a gaseous phase and particles of snow by a process well known in the art. The gaseous $CO_2$ is discharged into atmosphere or recovered for converting back to liquid or used to also extinguish fires. The snow particles are aggregated into larger flakes and compressed into pellets in a compression structure by a rotor with radially movable blades forming variable volume pockets associated with the interior of a housing to compress the flakes into pellets. The pellets may be discharged from the housing into an airlock which includes a rotor to convey the pellets to an air discharge that is isolated from the compression structure to facilitate conveyance of the pellets to a point of use, such as the site of a fire in order to extinguish the fire.

24 Claims, 9 Drawing Sheets

FIG. 1
FIG. 2
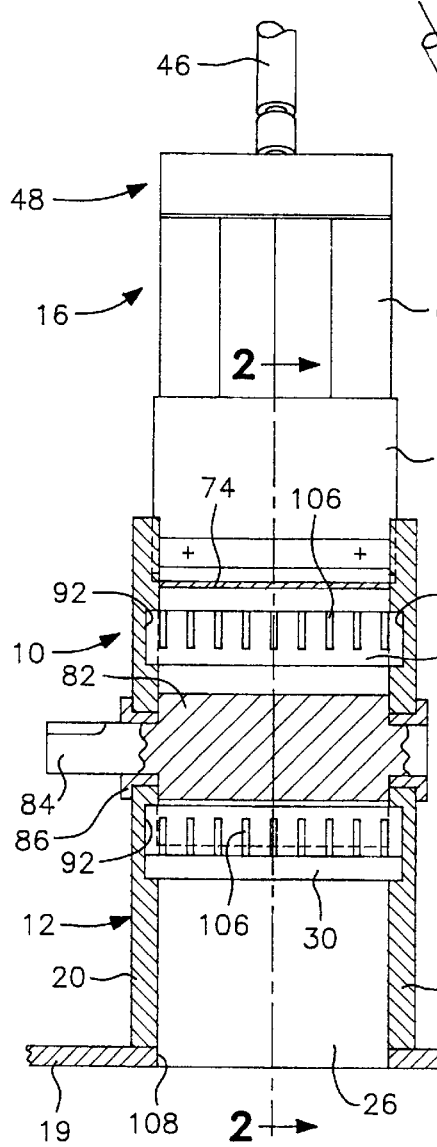
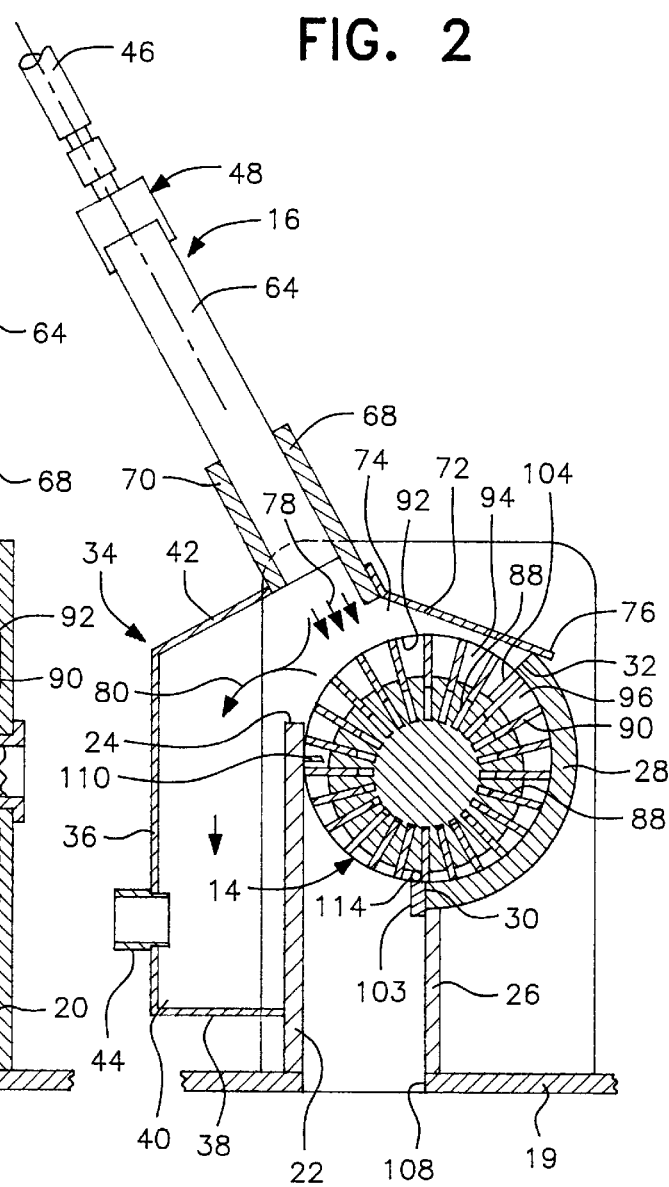

APPARATUS FOR RAPID, HIGH VOLUME PRODUCTION OF SOLID CO₂ PELLETS

BACKGROUND OF THE INVENTION

1. Field of the Invention

The present invention relates to a lightweight, highly mobile and efficient apparatus for instantaneously producing a high volume of compacted, solid carbon dioxide ($CO_2$) pellets. The apparatus utilizes liquid $CO_2$ that is discharged through nozzles and expanded to reach a triple point condition in which solid, liquid and gaseous forms of $CO_2$ can coexist and flash to a mixture of $CO_2$ in a gaseous phase and particles of snow in a process well known in the art. The gaseous $CO_2$ is discharged into atmosphere or recovered for converting back to liquid by a vacuum recovery system or for use in extinguishing fire. The snow particles are aggregated into larger snowflakes which are compressed into pellets by an eccentrically supported rotor having radially movable vanes or blades mounted in radial slots in the rotor. The rotor and blades form circumferentially moving pockets associated with the interior surface of a partial rotor housing to compress the flakes into pellets as the volume of the pockets reduce as the rotor and blades rotate to a point of pellet discharge. The blades include slots extending to their outer edges which receive dividers rigidly mounted on the partial housing to divide the elongated pockets along the length of the rotor, housing and adjacent blades into smaller pockets to form smaller pellets. The smaller pellets are discharged from the partial rotor housing into an air lock which includes a housing and bladed rotor to convey the pellets to a discharge that is isolated from the pellet compression structure. The air lock includes an air discharge for the pellets to facilitate conveyance of the pellets to a point of use, such as the site of a fire in order to extinguish the fire.

2. Description of the Prior Art

The formation of $CO_2$ pellets from $CO_2$ snow is well known. Such pellets have been used for various purposes such as abrasive blasting when projected against a surface, conveying materials, neutralizing harmful substances in ambient air, quick freezing foods or other materials and the like.

The following U.S. patents disclose various uses of liquid $CO_2$ including apparatuses to form $CO_2$ pellets from liquid $CO_2$.

U.S. Pat. No. 4,033,736
U.S. Pat. No. 4,389,820
U.S. Pat. No. 4,977,910
U.S. Pat. No. 5,355,962
U.S. Pat. No. 5,419,138

While certain of the prior patents disclose apparatuses for forming $CO_2$ pellets, the operational characteristics including slow start up, low production volume and structural details including large heavy components and power requirements for operation have restricted the use of $CO_2$ pellets for various uses.

For example, in U.S. Pat. No. 4,033,736, the impeller 80 is eccentrically mounted with respect to the housing 30. Snow is formed from liquid $CO_2$ between the housing and impeller. When the impeller rotates, the snow is displaced radially through the extrusion passageways 52 in which the snow is compacted essentially by the reaction of springs 76. In the present invention, the snow is compressed as it moves circumferentially between the rotor and the housing in the pockets formed by the housing, rotor and radially movable blades on the rotor as the pockets move circumferentially and reduce in volume due to the eccentric relationship of the rotor and housing.

U.S. Pat. No. 5,419,138 discloses the use of a hydraulic ram to compact $CO_2$ snow into pellets and discusses the development of prior apparatuses for producing $CO_2$ pellets and snow, the uses of such pellets and snow and the operational parameters of the prior art. The production volume of the apparatus is low and the start up time is long. Also, the structure is heavy and requires substantial power to operate.

In contrast, the apparatus of the present invention provides instantaneous, high volume production of high density solid $CO_2$ pellets and requires a small power input to produce pellets "on the spot" where such pellets are desired to suppress fires, reduce pollution and other various uses.

SUMMARY OF THE INVENTION

Gaseous carbon dioxide with or without snow particles has been used to suppress fires, especially under certain hazardous conditions, for many years. Until the development of halon systems, $CO_2$ was the only gaseous fire suppressant to effectively suppress fires of most materials with the exception of certain active metals and material containing their own oxygen source. Gaseous carbon dioxide is a desirable fire suppressant since it is not combustible, does not produce its own products of decomposition, provides its own pressurization for discharge from a storage container thereby eliminating the need for additional pressurization, leaves no residue thereby precluding the need of agent cleanup, relatively nonreactive with most materials, provides three dimensional protection because it is a gas under ambient conditions, is electrically nonconductive and can be used in the presence of energized electrical equipment. However, the use of gaseous $CO_2$ has been somewhat restricted as a fire suppressant or extinguisher due to the inability of delivering gaseous $CO_2$ to the site of a fire for distances much greater than 10 to 15 feet. Also, prior art devices do not produce sufficiently high volumes of $CO_2$ pellets that can be delivered long distances to effectively fight fires and pollution.

Halon based systems are being phased out due to regulations of the Environmental Protection Agency (EPA) mandating phase out of ozone depleting substances. Carbon dioxide is considered an alternative technology and this invention provides for the use of $CO_2$ as a replacement for halon and other ozone depleting substances which may harm the environment such as various foaming agents and the like.

It is an object of the present invention to provide an apparatus for instantaneously producing a high volume of high density solid carbon dioxide pellets from pressurized liquid carbon dioxide utilizing a relatively small, lightweight structure which is highly mobile. One embodiment of the invention has a total weight less than approximately 100 pounds, a height of approximately 30 inches and a depth and width of approximately 6 to 12 inches and powered by a small horsepower electric motor. The above dimensions may vary depending on the output desired. Alternatively, the unit can be powered by a gasoline or diesel powered engine of small horsepower. The above embodiment is capable of producing about 600 to 800 pounds of $CO_2$ pellets per hour depending upon the size of the components and the rotational speed of a rotor. The apparatus has a startup time of approximately 3 seconds thereby providing a very effective and inexpensive and rapidly activated fire suppressant system.

Another object of the invention is to provide an apparatus for producing carbon dioxide pellets in accordance with the present invention and the preceding object which includes a manifold receiving pressurized liquid carbon dioxide that is discharged through a plurality of nozzles into square expansion tubes in which the liquid carbon dioxide is transformed into a mixture of gaseous carbon dioxide and snow particles. The gaseous carbon dioxide is vented to atmosphere or discharged into a vapor recovery system. The snow particles formed in the tubes by the expanding $CO_2$ are aggregated in the pockets of a rotor system and compressed into solid carbon dioxide pellets.

A further object of the invention is to provide an apparatus for producing solid carbon dioxide pellets in accordance with the preceding objects in which the structure for compressing aggregated snow particles into pellets includes a partial generally cylindrical housing having a cylindrical rotor journalled therein with the rotational axis of the rotor being eccentric to the center of curvature of the partial cylindrical housing. The rotor includes radial slots receiving radially moveable vanes or blades having outer edges which are maintained in close contact with the interior of the partial cylindrical housing to form a plurality of closed pockets except for slots in the blades which receive arcuate dividers on the housing. The blades move radially in relation to the rotor as it rotates and moves the blades along the inner surface of the partial cylindrical housing to displace the snow particles and flakes circumferentially into a solid carbon dioxide pellet as the closed pockets formed by the housing, rotor and blades move from an inlet large volume to an outlet small volume. The dividers on the housing cut the pellet formed in each pocket into a plurality of smaller pellets which are discharged from the rotor.

An additional object of the invention is to provide an apparatus in accordance with the preceding object in which $CO_2$ is introduced into the compressor through a nozzle in either side wall or both side walls with the nozzle including an orifice to enable expansion of liquid $CO_2$ to its triple point.

A still further object of the invention is to provide an apparatus for producing carbon dioxide pellets as defined in the preceding objects in which a front wall is disposed in opposed relation to the partial cylindrical housing and includes projecting fins which are received in the blade slots to prevent snow particles from falling downwardly past the rotor and front wall. The apparatus also includes a source of pressurized air associated with the pockets as they move past the divider ends to assure removal of compressed solid pellets from the pockets.

Still another object of the invention is to provide an apparatus for producing carbon dioxide pellets in accordance with the preceding objects in which the smaller pellets are discharged from the rotor into an airlock for receiving the solid pellets. The airlock includes a cylindrical housing having a pellet inlet and a rotor with radial blades extending from the rotor into continuous engagement with the interior surface of the housing. The rotor and blades rotate about an axis concentric with the axis of the cylindrical housing and form a plurality of pockets having a constant volume. The housing includes a pellet outlet remote from the pellet inlet and also includes an air flow inlet and outlet which communicate with opposite ends of the airlock housing. Air flow through the housing entrains the solid carbon dioxide pellets and conveys the pellets from the airlock to a point of use or storage.

Another additional object of the invention is to provide an apparatus for producing $CO_2$ pellets in which pellets are discharged from a pellet compressor by gravity and liquid $CO_2$ is expanded in a tube discharging snow into pockets in the compressor with $CO_2$ gas being collected for subsequent use.

Still another additional object of the present invention is to provide an apparatus in accordance with the preceding objects in which the compressor rotor rotates about a central axis and the compressor has an eccentric interior cooperating with the rotor and blades to compress $CO_2$ snow into pellets.

Yet another very important object of the invention is to provide an apparatus for producing carbon dioxide pellets which is light in weight, small in overall size, capable of being transported easily, inexpensive to manufacture and operate, capable of easy and rapid startup and operation and capable of producing a high volume of carbon dioxide pellets for effective use for suppressing fires or for other uses.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partial vertical sectional view of the apparatus taken along the axis of a rotatable rotor for forming carbon dioxide pellets in accordance with the present invention.

FIG. 2 is a partial vertical sectional view taken along section line 2—2 on FIG. 1 illustrating the expansion and pellet compressing components of the present invention.

DESCRIPTION OF THE PREFERRED EMBODIMENTS

Figure 3:
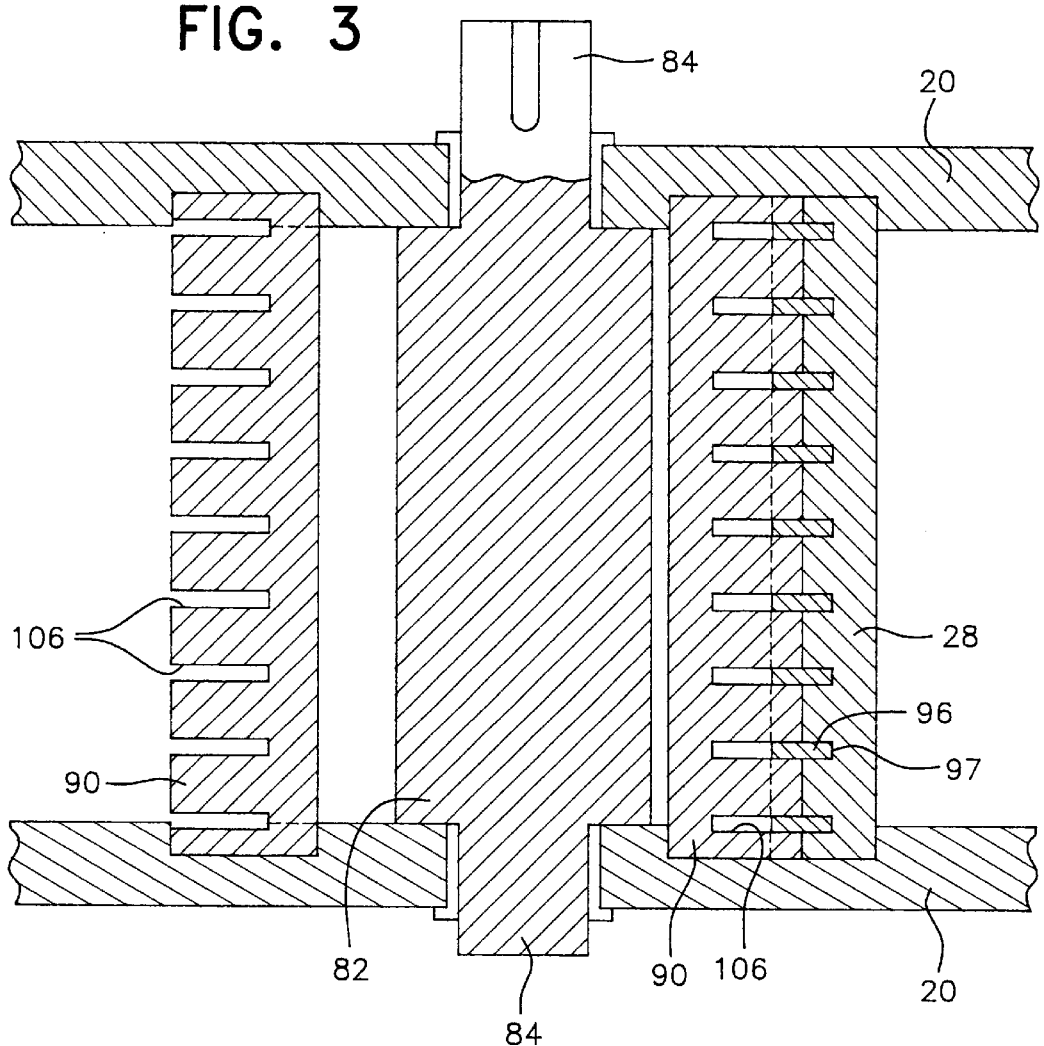
FIG. 3 is a detailed horizontal sectional view of the rotor, blades and housing taken along the rotational axis of the rotor.
Figure 4:
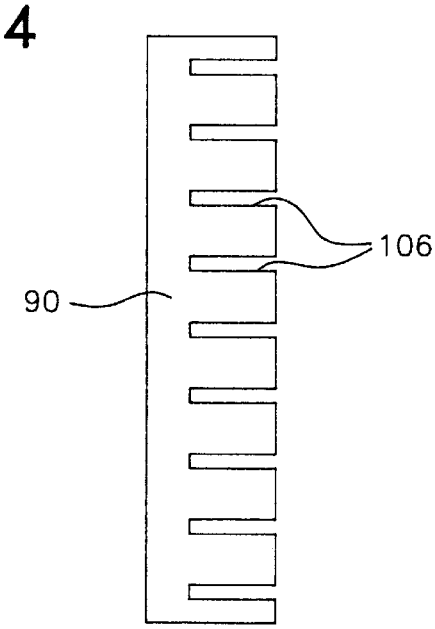
FIG. 4 is an enlarged elevational view of one of the movable rotor blades used in the pellet compressing structure.

Although only two preferred embodiments of the invention is explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

The apparatus for rapidly producing a large quantity of carbon dioxide pellets in accordance with the present invention is illustrated in the drawings and is generally designated by reference numeral 10. The apparatus includes a housing 12 supporting a rotary $CO_2$ compressor 14 communicated with a supply and expansion assembly 16 for liquid $CO_2$ at an inlet area thereof and communicated with an airlock 18 at a discharge area thereof to control the discharge of compacted solid $CO_2$ pellets formed by the compressor 14.

The housing 12 includes a generally horizontally disposed bottom plate 19, a pair of upwardly extending, spaced and generally parallel side walls 20 each of which is generally of rectangular configuration and rigidly connected with the base plate 19. An upstanding front wall 22 is connected rigidly with the base plate 19 and extends upwardly between the side walls 20 and terminates at an upper edge 24 substantially below the upper edge of the side walls 20 as illustrated in FIG. 2. Spaced from and generally parallel to the front wall 22 is a partial rear wall 26 extending vertically from the base plate 19 and extending between and rigidly connected to the side walls 20 in spaced relation to the rear edges of side walls 20. The upper end of the rear wall 26 terminates substantially below the upper edge 24 of the front wall 22 and is rigidly connected with an arcuate, partially cylindrical rotor housing 28 which has a lower end edge 30 in alignment with the front surface of the rear wall 26 and rigidly connected to the upper edge of rear wall 26. The partial cylindrical housing 28 extends between the side walls 20 and is rigidly connected with said walls 20 and includes an upper end edge 32 that is offset laterally toward the rear edge of side walls in relation to the lower end edge 30 of housing 28 as illustrated in FIG. 2.

Extending forwardly from the front wall 22 is a closed collection chamber 34 for gaseous $CO_2$ in a manner described hereinafter. The collection chamber 34 includes a front wall 36 spaced from front wall 22, a bottom wall 38, side walls 40 and an upwardly inclined top wall 42 extending from the upper edge of the front wall 36 to a point between the upper corners of the side walls 20 in spaced relation to the upper edge 24 of the front wall 22 as illustrated in FIG. 2. The front wall 36 of the collection chamber 34 includes a tubular member 44 extending therethrough adjacent to but in spaced relation to the bottom wall 38 for venting gaseous $CO_2$ from the collection chamber 34 to atmosphere or to a vacuum recovery system.

Figure 5:
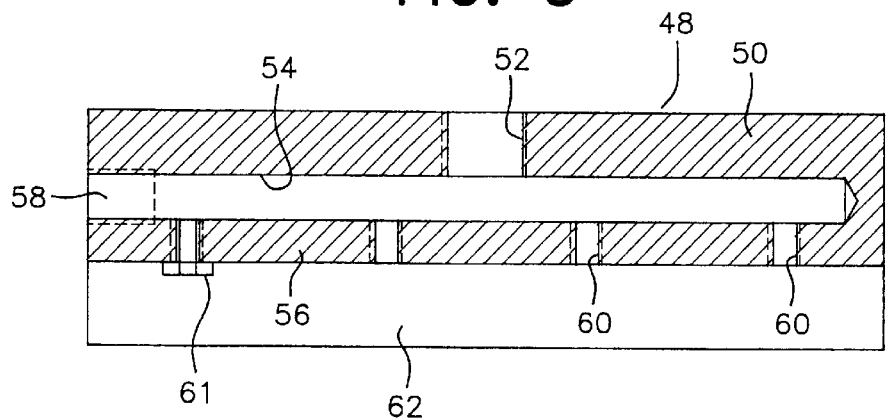
FIG. 5 is a longitudinal sectional view of the liquid $CO_2$ manifold illustrating the structure of the expansion nozzles.
Figure 6:
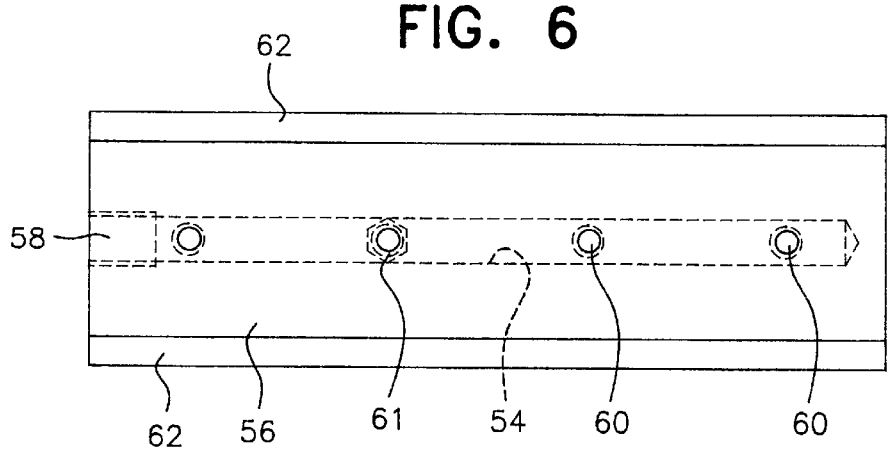
FIG. 6 is a bottom plan view of the manifold illustrating the position of the expansion nozzles.
Figure 7:
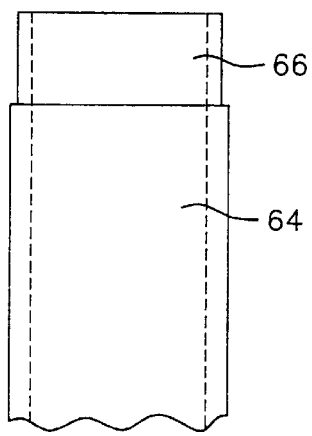
FIG. 7 is a fragmental side elevational view of an upper end of a square expansion tube.

The supply and expansion assembly 16 for liquid $CO_2$ includes a supply pipe or hose 46 that is communicated with a valved pressurized tank (not shown) which contains a supply of liquid $CO_2$ that can pass through the pipe 46 into a transversely elongated manifold 48. As illustrated in FIGS. 5 and 6, the manifold 48 includes a top wall 50 having an opening 52 communicated with the supply pipe 46. The manifold 48 includes a central longitudinal passageway 54 defined by a bottom wall 56 and the top wall 50. The horizontal passageway 54 terminates in spaced relation to one end of the manifold and is provided with a plug closure 58 at the opposite end thereof. The bottom wall 56 includes a plurality of longitudinally spaced threaded holes 60 extending from the passageway 54 to the lower surface of the bottom wall 56. A nozzle 61 is mounted in each of the holes 60 to control flow of liquid $CO_2$. Each of the side edges of the manifold include a depending flange 62. Supported between the flanges 62 is a plurality of square expansion tubes 64 each of which includes an upper end 66 of reduced cross-sectional area on its external surface, as illustrated in FIG. 7, to enable the upper end portion 66 to be telescoped between the flanges 62 on the manifold and enable the tubes 64 to be rigidly affixed to the manifold 48.

The expansion tubes 64 receive $CO_2$ from nozzles 61 and define expansion areas in which the liquid $CO_2$ passing through the restrictive flow path in each of the nozzles 61 enables the liquid $CO_2$ to expand and reach its triple point where $CO_2$ snow particles and gaseous $CO_2$ is formed for discharge down through the square tubes 64.

The lower ends of the expansion tubes 64 are telescoped between inclined spaced parallel walls 68 and 70 which extend between the side walls 20 of the housing 12 and which are rigidly affixed to the side walls 20. The walls 70 and 68 extend upwardly along a lower portion of opposed surfaces of the tubes 64 and the tubes 64 are rigidly affixed to the walls 70 and 68. As illustrated in FIG. 2, the walls 68 and 70 extend between the side walls 20 adjacent the upper corner thereof with the lower edge of the wall 70 being generally in alignment with but spaced vertically from the top edge 24 of the front wall 22. The top wall 42 of the collection chamber 34 is connected to the bottom edge portion of the wall 70. The other wall 68 extends downwardly and inwardly between the side walls 20 a greater distance than the wall 70 and includes a laterally extending flange 72 in the form of a plate having an upturned upper edge 74 secured to the lower edge portion of the wall 68 and a terminal edge portion 76 which overlies and engages the top edge of the partial cylindrical rotor housing 28 as illustrated in FIG. 2.

The supply and expansion assembly 16 extends upwardly from the housing 12 in angular related position rather than vertically upwardly therefrom in order to reduce the overall height of the apparatus and also to facilitate aggregation of the snow particles into larger particles or flakes as the downward movement of the expanding $CO_2$ will impinge along the lower wall surface of the square tubes 64. The snow and gaseous $CO_2$ passes downwardly in an angular direction into the area of the housing 12 spaced above the compressor 14 as indicated by arrows 78. The gaseous $CO_2$ will separate from the snow particles and be discharged into the collection chamber 34 through the space between the upper edge 24 of front wall 22 and the lower edge of wall 70 so that the gas can pass downwardly into the collection chamber 34 as indicated by arrows 80 for discharge through the tubular outlet 44.

The compressor 14 includes a generally cylindrical rotor 82 extending between the side walls 20 of the housing 12 and including a stub shaft 84 on each end thereof which extend through and are journalled in the side walls 20 by a support bearing or bushing 86. One stub shaft 84 which is longer than the other is connected to a drive motor (not shown) in any well known manner. The drive motor may be a small horsepower electric motor or a small horsepower gasoline or diesel motor or other source of power to rotate the rotor at various speeds.

The rotor 82 includes a plurality of radial slots 88 which are equally spaced circumferentially in the periphery of the rotor and which extend inwardly an equal distance from the outer surface. Positioned in each of the slots 88 is a movable blade 90 of rectangular configuration with the blades 90 being capable of radial movement in the slots 88. The blades 90 are slightly longer than the distance between the side walls 20 and the ends of each of the blades are received in inwardly facing cavities 92 in the opposed inner surfaces of the side walls 20 as illustrated in FIGS. 1 and 3. As illustrated in FIG. 2, the outer periphery of each cavity 92 is generally tangential to the inner surface of the upper end portion of the front wall 22 and the outer periphery of the cavities 92 coincide with the inner surface of the partial cylindrical rotor housing 28. Thus, as the ends of the blades 90 move in a circular path, the outer edges of the blades come into close contact with the inner surface of the partial cylindrical rotor housing 28 and the inner top surface of the cavities 92. The rotor 82 is journalled about an axis that is eccentric with respect to the center of the circular cavities 92 and the center axis of the partially cylindrical interior surface of the rotor housing 28. This causes the blades 90 to move radially inwardly from an extended position when the blades are facing the expansion tubes 64 and the plate 72 toward the rotor 82 as they move along the inner surface of the partial cylindrical housing 28 to a discharge point defined by the end edge 30 of the partial cylindrical housing 28. The blades 90 move in a circular path having an axis spaced from the center of rotation of the rotor 82 during the rotational movement of the rotor 82 and blades 90.

The outer edges of adjacent blades 90 and the outer surface of the rotor 82 define pockets 94 extending the length of the rotor when the outer edge of the blades 90 come into contact with housing 28. The pockets 94 are divided by a plurality of dividers 96, preferably nine, which are rigidly mounted in shallow grooves 97 in housing 28 and project inwardly from the partially cylindrical inner surface of the partial cylindrical rotor housing 28. Each of the dividers 96 includes an arcuate outer edge 98 corresponding with the partial cylindrical grooves 97 in the inner surface of the partial cylindrical housing 28 and a circumferential inner edge 100 eccentric to the edge 98 and coincidental with the cylindrical external surface of the rotor 82. The center of the circular surface of the rotor 82 is eccentric in relation to the center of the cylindrical surface defined by the cavities 92 and inner surface of the partial cylindrical housing 28. Each of the dividers 96 includes a discharge end 102 corresponding with and aligned with the end edge 30 of the partial cylindrical housing 28. Each divider 96 also includes an upper end edge 104 that is beveled from each side surface to a central point and which is aligned with the upper end edge 32 of the partial cylindrical housing 28 to cut the pellet in each pocket 94 into eight generally equally sized smaller pellets 95 for discharge from each pocket 94. The discharge end edge 102 of each divider 96 is engaged by a stopper strip 103 which aids in retaining the dividers 96 in place in grooves 97 in partial cylindrical housing 28 as shown in FIG. 3.

Each of the blades 90 includes a plurality of longitudinally spaced slots 106 which extend to the outer edge thereof and are aligned with and receive the dividers 96. As the blades 90 pass from a position in alignment with the upper edge 32 of the partial cylindrical housing 28 to a position in alignment with the lower end edge 30 of the partial cylindrical housing 28 and stopper strip 103, the pockets 94 are closed as soon as each pair of adjacent blades 90 passes the end edge 32 of the partial cylindrical housing 28. The closed pockets progressively decrease in volume until they pass the end edge 30 of the partial cylindrical housing 28 and stopper strip 103 and snow particles within the pockets 94 will have been compacted and solidified as the pockets 94 reduce in volume. The compacted snow pellets are then discharged downwardly from the pockets 94 along the surfaces defined by the front wall 22 and rear wall 26 through an opening 108 in the bottom plate 19 for discharge into the airlock 18.

The inner surface of the front wall 22 is provided with a plurality of parallel, spaced fins 110, as illustrated in FIGS. 2, 8, 8A and 9, which extend inwardly into the slots 106 in the blades 90 as the blades move upwardly past the fins 110. The fins 110 in slots 106 prevent snow from falling through the relatively wide unoccupied slots 106 in blades 90 and into pellet chamber defined by the side walls 20, rear wall 26 and from front wall 22 and becoming mixed with the pellets 95 being discharged from rotor 82.

Figure 10:
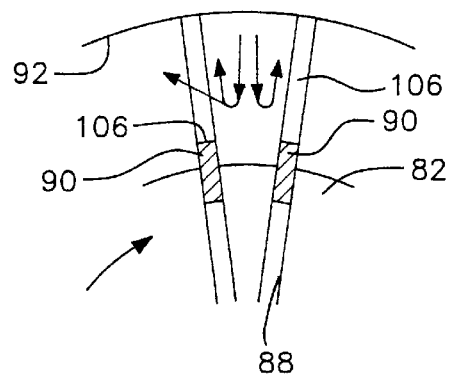
FIG. 10 is a schematic view of one of the pockets which receives snow particles and gaseous $CO_2$.
Figure 8:
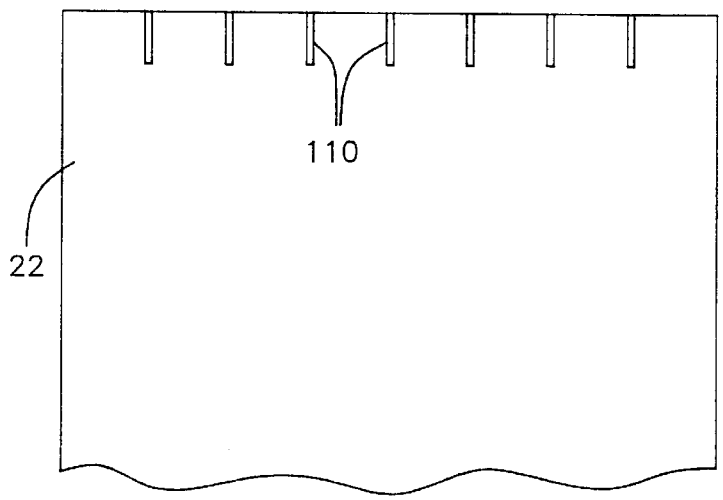
FIG. 8 is a fragmental elevational view of the front wall of the support housing for the rotor illustrating fins on the surface thereof facing the rotor.
Figure 8A:
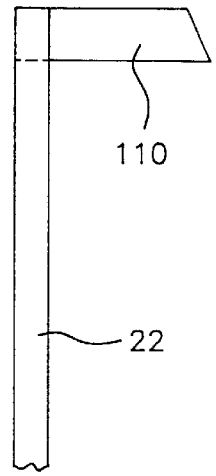
FIG. 8A is a side elevational view of the front wall of the support housing illustrating the configuration of the fins.
Figure 9:
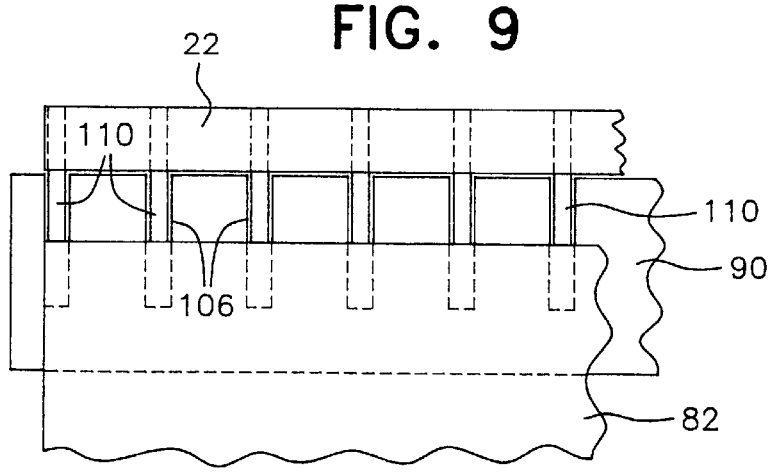
FIG. 9 is a detailed schematic view illustrating the relation between the rotor blades and fins.
Figure 12:
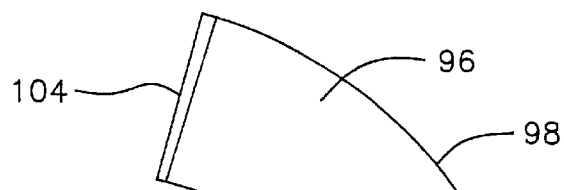
FIG. 12 is a view of a divider showing the beveled upper end to divide the pellet formed in a volume reducing pocket into smaller pellets.
Figure 11:
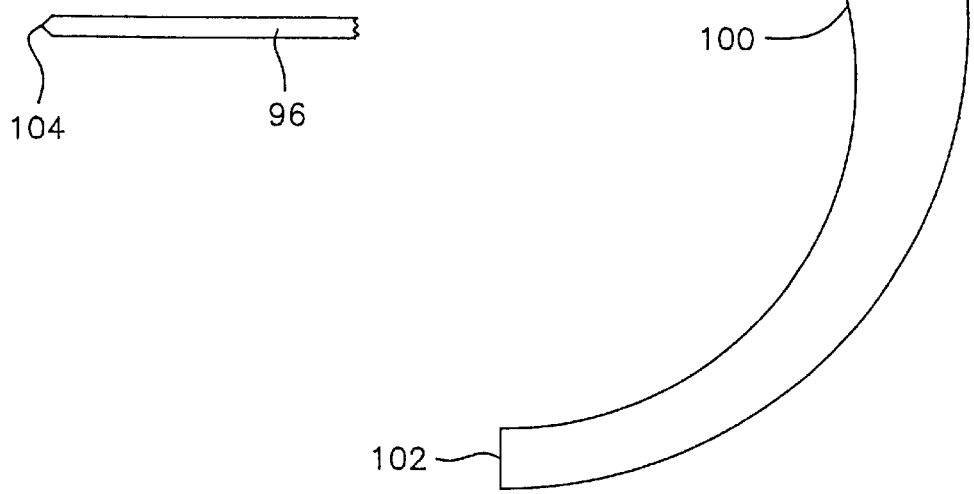
FIG. 11 is a detailed view of one of the dividers which are mounted on a partial cylindrical housing.

As the snow particles and gaseous $CO_2$ are discharged from the square expansion tubes 64, the square configuration of the tubes becomes significant since the pockets 94 defined by the outer edges of the blades 90 which extend beyond the outer surface of the rotor 82 include parallel surfaces defined by adjacent blades and a longitudinally straight surface defined by the outer surface of the rotor. Thus, as the snow particles and gaseous material enter the pockets 94, the gaseous material will reverse its flow path and partially exit through the slots 106 in the blades thereby enabling the entire generally rectangular configuration of the pockets 94 to be more evenly filled with snow. Any gaseous $CO_2$ which remains entrained with the snow even after passing between the lower edge of the expansion tubes 64 and into the pockets 94 can migrate through the slots 106 by reversing flow, as illustrated in FIG. 10, thereby leaving the pockets completely filled with the snow.

Figure 13:
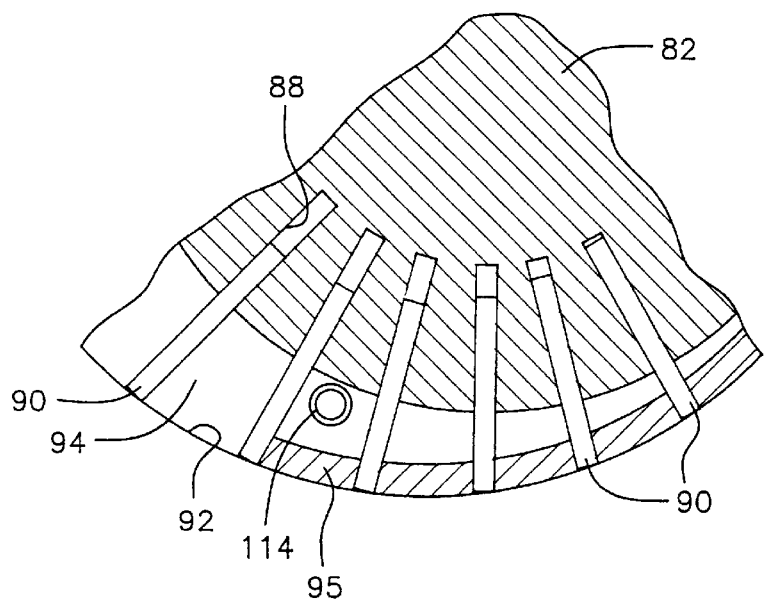
FIG. 13 is a fragmental sectional view illustrating the association of an air inlet with the rotor and pockets to remove pellets from the rotor.

As shown in FIG. 13, in order to remove compacted and to solidified $CO_2$ pellets 95 from pockets 94 after the pellets have been finally compressed, either or both side walls 20 are provided with an air inlet 114 in alignment with each pocket 94 just after it passes the discharge end edge 30 of the partial cylindrical housing 28 and stopper strip 103. The air inlet 114 is communicated with a pressurized source of air so that when the blade 90 which is the leading blade of a pocket 94 passes the end edge 30 of the housing 28 and stopper strip 103, air pressure will assure that all of the $CO_2$ pellets will be discharged as the pellets pass beyond the end edge 30 of the housing 28, the end edges 102 of the dividers 96 and stopper strip 103 thereby assuring that all $CO_2$ pellets will be dislodged from the pockets 94 into the pellet chamber, through discharge opening 108 and into airlock 18.

Figure 14:
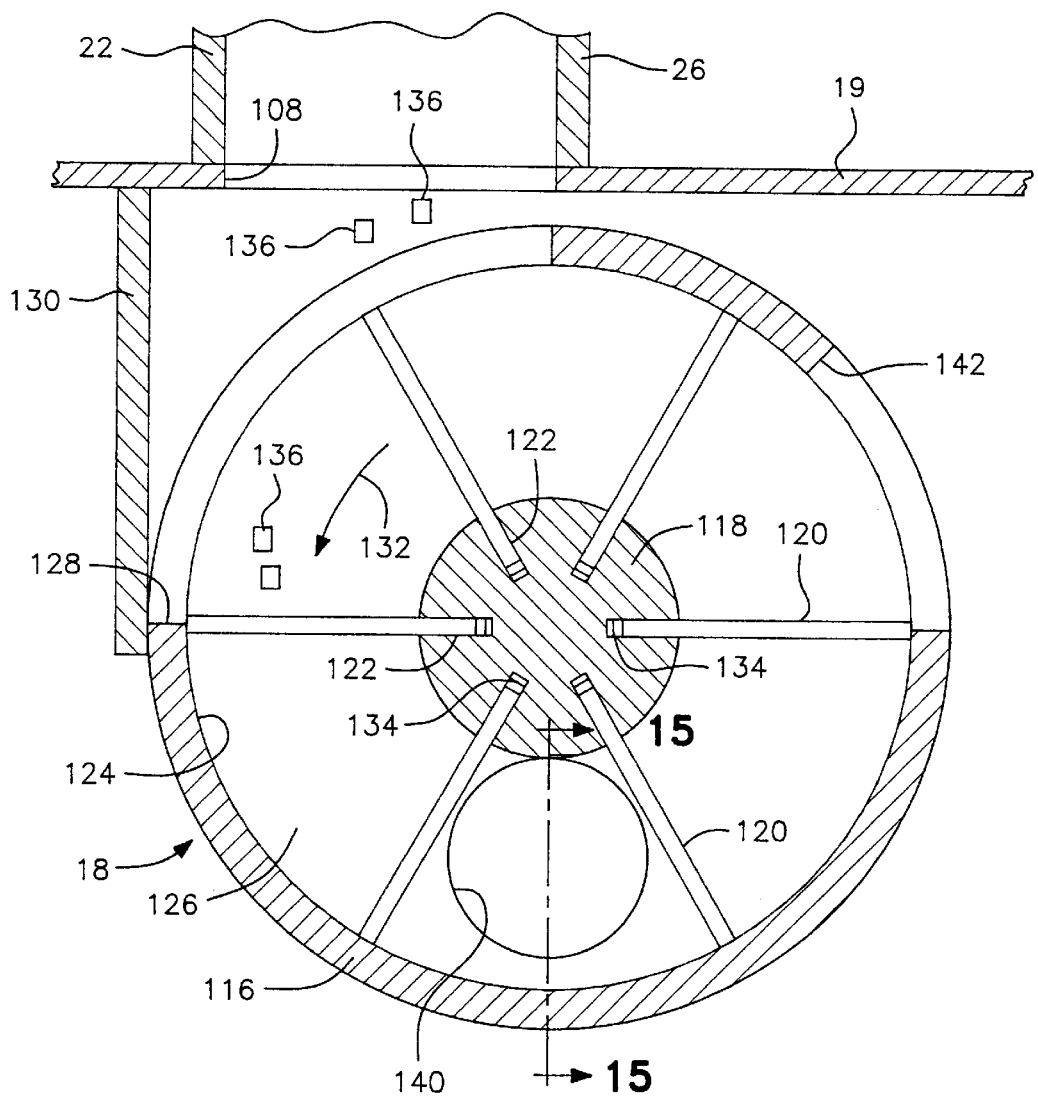
FIG. 14 is a vertical sectional view of an airlock for receiving solid compressed $CO_2$ pellets discharged from the rotor pockets and controlling the discharge of pellets from the apparatus.
Figure 15:
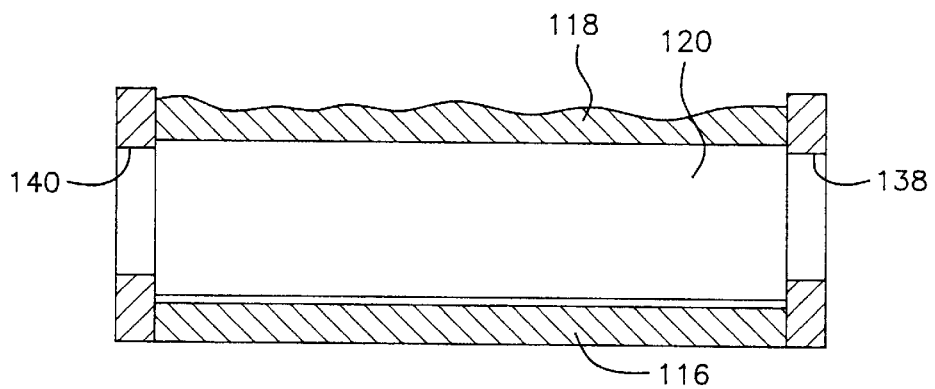
FIG. 15 is a horizontal sectional view of the airlock illustrating an air flow inlet and outlet.

As illustrated in FIGS. 14 and 15, the airlock 18 includes a cylindrical housing 116 having a rotor 118 journalled therein and which is rotatably driven about an axis concentric with the housing 116. The rotor 118 includes a plurality of radial blades 120 radially movable in and extending from grooves 122 in the rotor 118 into contact with the interior surface 124 of the housing 116. The rotor 118, blades 120 and interior surface 124 of the housing 116 define a plurality of circumferentially extending pockets 126. The cylindrical housing 116 includes an arcuately extending inlet opening 128 in the upper quarter thereof which is in alignment with the discharge opening 108 in base plate 19 for receiving pellets 136 therefrom. A depending guide or plate 130 depends from the base plate 19 to a position generally tangential to the housing 116 at the lower edge of inlet opening 128 to retain the pellets 136 in the pockets 126 during the counterclockwise rotation of the rotor 118 as indicated by arrow 132. As illustrated, the rotor 118 includes six slots 122 and six blades 120 with each of the blades being biased outwardly into engagement with the interior surface 124 of the housing 116 by arcuate or zigzag flat springs 134 between the bottoms of the slots 122 and the inner edges of the blades 120. Thus, the adjacent blades 120 combined with the outer surface of the rotor 118 and the inner surface 124 of the housing 116 define the plurality of circumferentially oriented pockets 126. The rotor 118 may be driven by a small motor or driven from the same motor that drives rotor 82 of compressor 14.

As the rotor 118 rotates, compacted pellets 136 which have been discharged from the compressor 14 fall down by gravity into and fill the successive pockets 126 as they align with the openings 108 and 128. The pockets 126 are isolated as they move from a position aligned with the opening 128 toward a lower portion of the housing 116. As shown in FIG. 15, at the lower portion of the housing 116, one end wall thereof is provided with an air inlet 138 which is connected with a pressurized source of air and at the opposite end of the housing 116, an air and pellet outlet 140 is provided which is slightly larger than inlet 138. The air flow through housing 116 from the inlet 138 and out through the outlet 140 will entrain and discharge the pellets and convey the pellets to a point of use, storage area or the like. If any air, under pressure, becomes entrapped in the pocket 126 when it is aligned with the inlet 138 and outlet 140, it will be discharged through an air discharge opening 142 in housing 116 as the pockets become aligned with the discharge opening 142 prior to their alignment with the opening 128 during which the pockets 126 will be refilled with solid carbon dioxide pellets 136.

Figure 16:
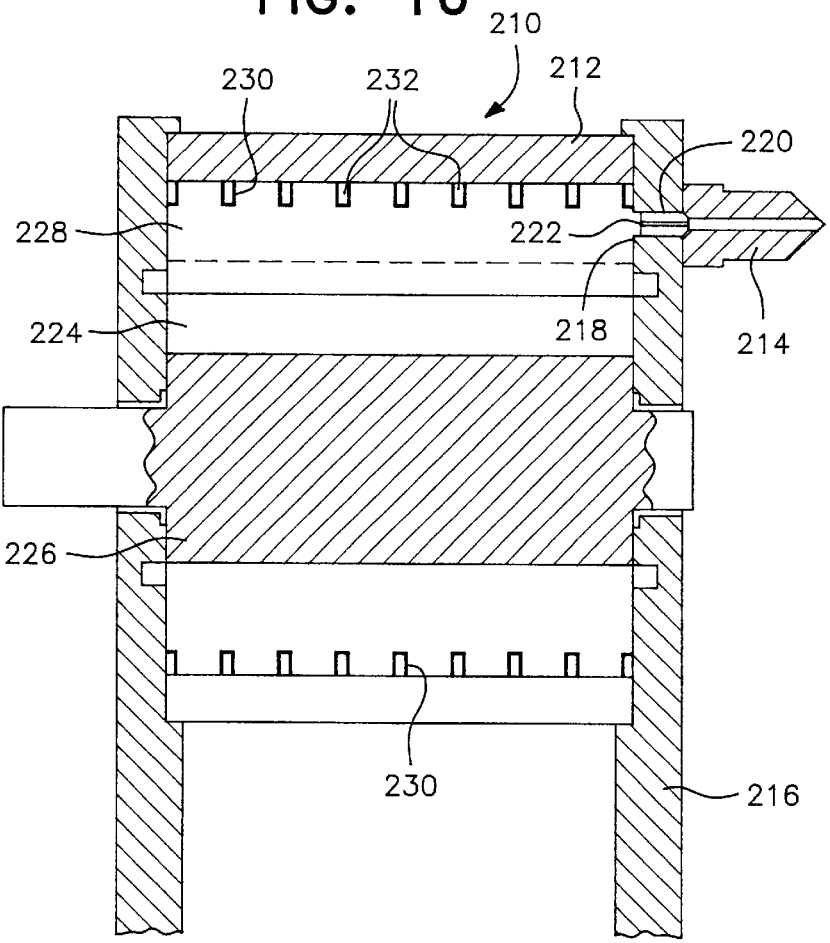
FIG. 16 is a longitudinal, vertical sectional view, similar to FIG. 1, illustrating another embodiment of the apparatus utilizing a nozzle to introduce $CO_2$ into the compressor.
Figure 17:
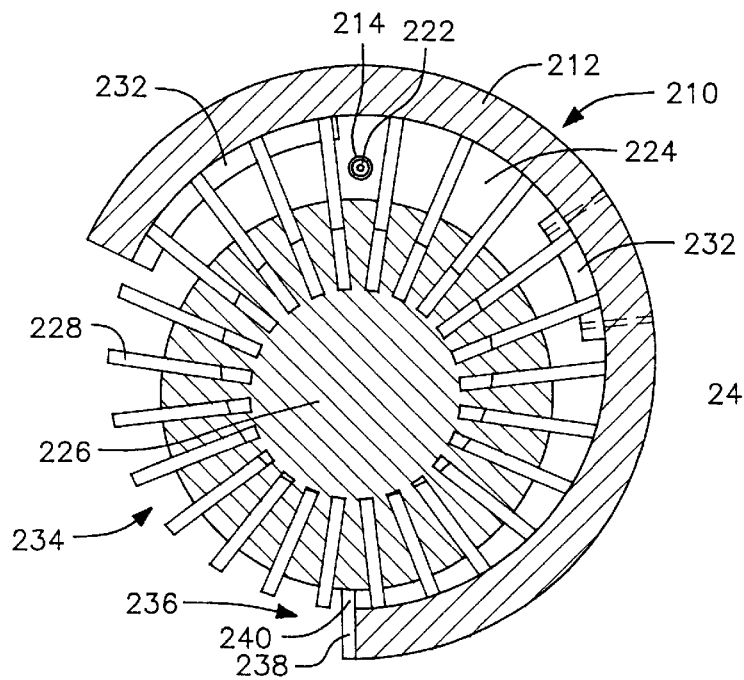
FIG. 17 is a transverse sectional view of the embodiment of the invention illustrated in FIG. 16.
Figure 18:
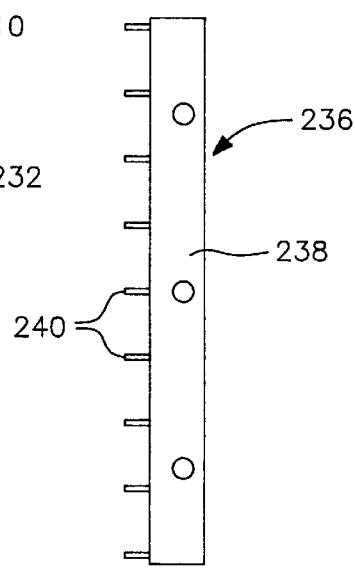
FIG. 18 is a detailed view of a pellet cutter bar used in this embodiment of the invention.

FIGS. 16–18 illustrate a second embodiment of the invention in which liquid $CO_2$ is introduced into a rotary compressor 210 including a housing 212 through an expansion nozzle 214 in either or both side walls 216. The nozzle 214 includes a projection 218 mounted in an aperture 220 in side wall 216 and includes a small diameter orifice 222 through which liquid $CO_2$ passes and expands and reaches its triple point with snow particles and gaseous $CO_2$ being discharged into chambers or pockets 224 similar to pockets 94 illustrated in FIGS. 1–12. The compressor 210 includes an eccentric rotor 226 provided with radially movable blades 228 having radially outer edges engaging the interior of the housing 212 to form closed chambers 224 to compress the snow particles into long blocks of $CO_2$ as the rotor rotates in a manner similar to that in FIGS. 1–12. The blades 228 have slots 230 in the outer edges thereof to receive arcuate blockers 232 therein. The blockers 232 extend an arcuate distance greater than the distance between adjacent blades 228 to form a closure for the slots 230 to avoid rapid discharge of gaseous $CO_2$ to atmosphere. A set of blockers 232 is positioned at opposite sides of the nozzle 214 with the blockers 232 associated with the blades 228 approaching the nozzle 214 being longer than the blockers 232 associated with the blades 228 leaving the nozzle 214 and moving toward a large pellet discharge area 234 in housing 212 to retain snow particles while restricting flow of gases to atmosphere.

The discharge area 234 extends from a position generally diametrically opposed to the nozzle 214 to about 135° around the periphery of housing 212 in order to permit the pellets to fall by gravity from rotor, blades and housing. At the discharge area 234, a pellet cutter 236 is positioned which is in the form of a bar 238 housing projections 240 which extend into the notches 230 in the blades 228 to cut the compressed blocks into pellets as illustrated in FIG. 18. Also, the air assisted discharge as shown in FIG. 13 may be used to assist in discharge of the compressed pellets from chambers 224 at the discharge area 234.

Figure 19:
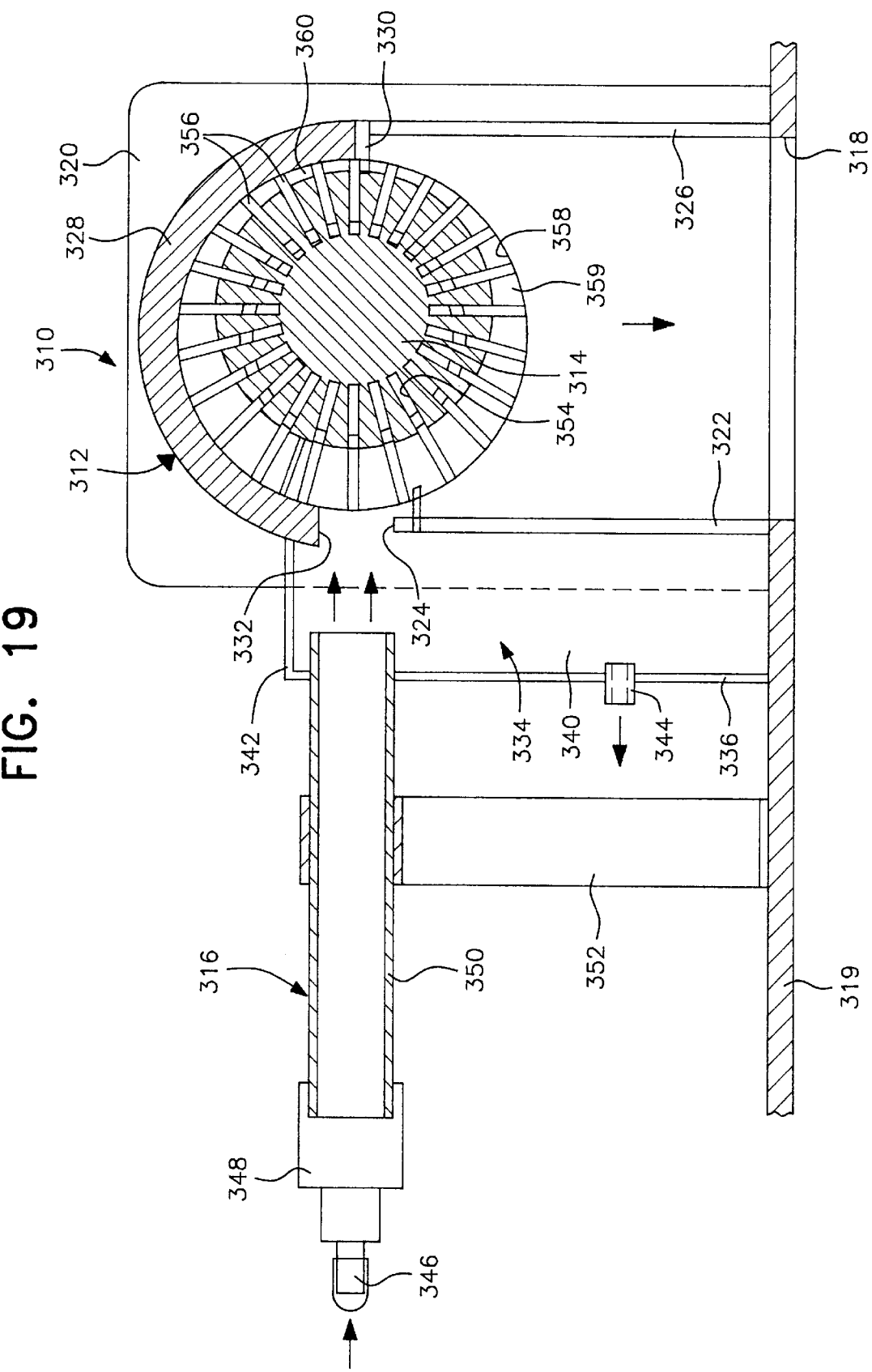
FIG. 19 is a longitudinal, vertical sectional view illustrating another embodiment of the invention.

The apparatus for rapidly producing a large quantity of carbon dioxide pellets in accordance with the present invention illustrated in FIG. 19 is generally designated by reference numeral 310. The apparatus includes a housing 312 supporting a rotary $CO_2$ compressor rotor 314 communicated with a supply and expansion assembly 316 for liquid $CO_2$ at an inlet area thereof and an outlet 318 enabling discharge to an airlock in a manner similar to FIG. 2.

The housing 312 includes a generally horizontally disposed bottom plate 319, a pair of upwardly extending, spaced and generally parallel side walls 320 each of which is generally of rectangular configuration and rigidly connected with the base plate 319. An upstanding front wall 322 is connected rigidly with the base plate 319 and extends upwardly between the side walls 320 and terminates at an upper edge 324 substantially below the upper edge of the side walls 320 as illustrated in FIG. 19. Spaced from and generally parallel to the front wall 322 is a partial rear wall 326 extending vertically from the base plate 319 and extending between and rigidly connected to the side walls 320 in spaced relation to the rear edges of side walls 320. The upper end of the rear wall 326 terminates substantially even with the upper edge 324 of the front wall 322 and is rigidly connected with an arcuate, partially cylindrical rotor housing 328 which has an end edge 330 in alignment with the rear wall 326 and rigidly connected to the upper edge of rear wall 326. The partial cylindrical housing 328 extends between the side walls 320 and is rigidly connected with said walls 320. The housing 328 includes an end edge 332 that is offset in relation to the end edge 330 of housing 328 as illustrated in FIG. 19.

Extending forwardly from the front wall 322 is a closed collection chamber 334 for gaseous $CO_2$ and includes a front wall 336 spaced from front wall 322, a bottom wall forming part of bottom wall 319, side walls 340 and a top wall 342 extending from the upper edge of the front wall 336 to housing 328 adjacent end edge 332 and extends between side walls 320 in spaced relation to the upper edge 324 of the front wall 322. The front wall 336 of the collection chamber 334 includes a tubular member 344 extending therethrough adjacent to but in spaced relation to the bottom wall 319 for venting gaseous $CO_2$ from the collection chamber 334 to atmosphere, a vacuum recovery system or to an apparatus for using gaseous $CO_2$ to extinguish fires.

The supply and expansion assembly 316 for liquid $CO_2$ includes a supply pipe or hose fitting 346 that is communicated with a valved pressurized tank (not shown) which contains a supply of liquid $CO_2$ that can pass into an elongated manifold 348 and into an expansion tube or tubes 350 supported by bracket 352 supported from bottom plate 319. The manifold 348 includes an orifice or orifices (not shown) similar to those shown in FIGS. 5 and 6.

The expansion tube or tubes 350 define expansion areas to enable $CO_2$ to expand and reach its triple point where $CO_2$ snow particles and gaseous $CO_2$ is formed for discharge toward edge 332 of rotor housing 328 through collection chamber 334. The gaseous $CO_2$ will separate from the snow particles and be discharged into the collection chamber 334 so that the gas can pass downwardly into the collection chamber 334 for discharge through the tubular outlet 344.

The compressor rotor 314 is cylindrical and extends between the side walls 320 and includes a plurality of radial slots 354 which are equally spaced circumferentially in the periphery of the rotor and which extend inwardly an equal distance from the outer surface. Positioned in each of the slots 354 is a movable blade 356 of rectangular configuration with the blades 356 being capable of radial movement in the slots 354. The blades 356 are slightly longer than the distance between the side walls 320 and the ends of each of the blades are received in inwardly facing cavities 358 in the opposed inner surfaces of the side walls 320 in a manner similar to FIGS. 1 and 3. The outer periphery of each cavity 358 is the inner surface of the partial cylindrical rotor housing 328. Thus, as the ends of the blades 356 move in a circular path, the outer edges of the blades come into close contact with the inner surface of the partial cylindrical rotor housing 328 and the inner top surface of the cavities 358. The rotor 314 is journalled about an axis that is eccentric with respect to the center axis of the partially cylindrical interior surface of the rotor housing 328. This causes the blades 356 to move radially inwardly from an extended position when the blades 356 and cavities 358 are facing the expansion area and inlet defined by edge 332 of housing 328 and edge 324 of wall 322 and move inwardly toward the rotor 314 as they move along the inner surface of the partial cylindrical housing 328 to a discharge area defined by the end edge 330 of the partial cylindrical housing 328. The blades 356 move in a circular path having an axis spaced from the center of rotation of the rotor 314 during the rotational movement of the rotor 314 and blades 356.

The inner surface of housing 328, the adjacent blades 356 and the outer surface of the rotor 314 define pockets 359 extending the length of the rotor 314 and blades 356 when the outer edge of the blades 356 are in contact with housing 328. The cavities 359 are divided by a plurality of dividers 360 which are rigidly mounted in shallow grooves in housing 328 and project inwardly from the partially cylindrical inner surface of the partial cylindrical rotor housing 328 as illustrated in FIGS. 1–12. This embodiment of the rotor, blades and housing function in a manner similar to FIGS. 1–18 and include the same structures as illustrated for discharging pellets downwardly toward outlet 318.

Figure 20:
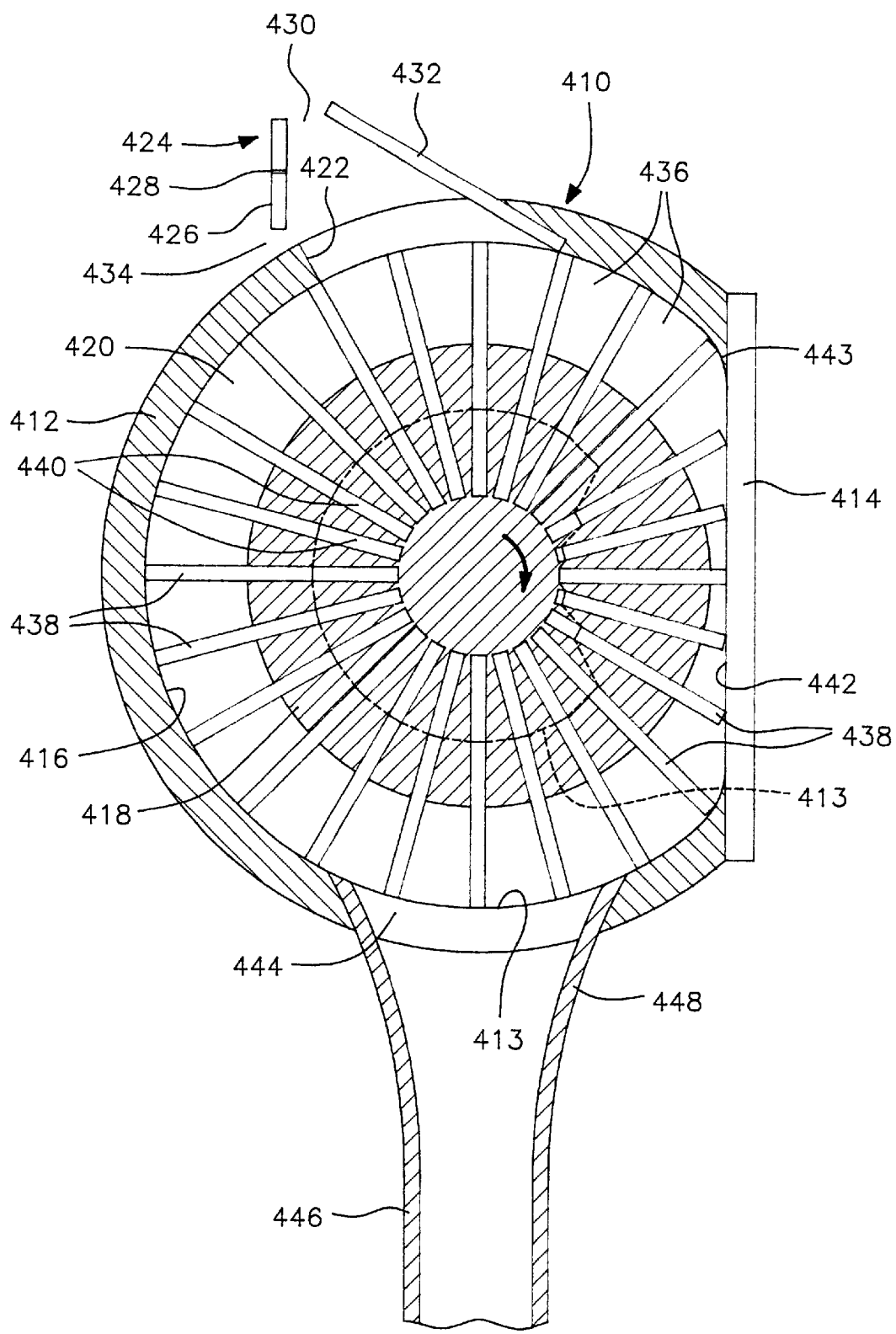
FIG. 20 is a vertical sectional view of another embodiment of the invention in which the rotor rotates about a central axis and the housing includes an eccentric interior.

The embodiment of the present invention illustrated in FIG. 20 includes a compressor for forming $CO_2$ pellets generally designated by reference numeral 410 and which includes a rotor housing 412 of generally cylindrical configuration but includes a flat plate or straight portion 414 in opposed relation to the center of a cylindrical interior surface 416 which extends around a major portion of housing 412. A rotor 418 is journalled in end walls 420 of housing 412 and rotates about its central axis which is coincident with the center of the cylindrical portion 416 of housing 412. The housing 412 includes an inlet 422 in communication with a $CO_2$ supply assembly 424 which includes a plate 426 having a nozzle or orifice 428 through which liquid $CO_2$ passes and expands to form snow particles and gaseous $CO_2$. Gaseous $CO_2$ can escape at 430 between plate 426 and plate 432 which has one edge connected with housing 412 and forming one edge of inlet 422. Gaseous $CO_2$ can also escape at 434 between an edge of nozzle plate 424 and the exterior of housing 412 adjacent inlet 422.

The snow particles formed by expanding liquid $CO_2$ passes through inlet 422 and into pockets 436 formed by radial blades 438 mounted in slots 440 in rotor 418. The end walls of housing 412 include annular cavities 413 which are shaped similar to the interior 416 of housing 412 and the inner surface of flat plate 414 to control movement of the blades 438 in slots 440. The radial slots 440 enable radial movement of the blades 438 so that the outer edges of the blades 438 are in constant close relationship with the interior surface 416 of the cylindrical portion of housing 412 and with the straight interior surfaces 442 of flat plate 414 in a manner similar to the end cavities in FIGS. 1–19.

The housing 412 includes a discharge opening 444 in diametrically opposed relation to inlet 422. The discharge opening 444 includes a discharge tube 446 having an outwardly flared upper end 448 connected to the opening 444 to facilitate gravity discharge of $CO_2$ pellets from the rotor pockets 436 as the blades pass over opening 444. This structure is simplified as the outer edges of the radial blades 438 engage the interior surfaces 416 and 442 and control the position of the blades 438 and the size of the pockets 436. The pockets 436 remain the same size when blades 438 are engaged with partial cylindrical surface 416. However, due to the interior straight surface 442 being eccentric in relation to the rotational axis of the rotor 418, the pockets 436 will reduce in volume until the blades pass the center of the plate 414 thereby compressing snow particles in the pockets 436. As rotation of the rotor continues in a clockwise direction, the blades 438 passing the center of plate 414 toward discharge opening 444 cause the volume of the pockets 436 to increase thereby releasing the compressed pellets to fall through opening 444 into discharge tube 446. The juncture between the cylindrical surface 416 and eccentric surface 442 may include a curved transition surface 443 to provide smoother movement and less wear of the blades 438 and surfaces 442 and 443.

The present invention provides for the use of carbon dioxide pellets as a replacement for halon fire suppressants or other ozone depleting chemicals which may harm the environment. This invention also removes restrictions to use of carbon dioxide due to the inability of prior art devices to reach fire from a long distance from the source of carbon dioxide. This invention provides instantaneous high volume production of high density solid carbon dioxide pellets from pressurized liquid carbon dioxide without the use of hydraulic rams or other large and heavy equipment to compress carbon dioxide snow into solid pellets and eliminates the use of an extruder for extruding carbon dioxide snow into pellets. The structure of the present invention is lightweight and capable of being portable and provided with a small horsepower motor for efficient operation. Also, the production capacity may be doubled or tripled by increasing the length of the compressor, rotor and related structures and the density of the pellets 136 may be varied by varying the rotational speed of rotor.

As is well known, fire includes three elements, fuel, oxygen and heat. Carbon dioxide pellets eliminates two of the three vital components required for a fire to be sustained by lowering the temperature and displacing the oxygen. Film forming foam can displace oxygen but does not lower the flash point as does carbon dioxide pellets. Other chemical agents separate the oxygen from the fire without reducing the flash point and in high temperature fires, chemical products may produce toxic conditions and deplete the ozone layer.

Certain prior art devices are relatively heavy and may weigh approximately 3,000 pounds and will produce approximately 200 pounds of carbon dioxide pellets per hour after a startup time of 10 to 15 minutes. Another prior art unit weighing 8,000 pounds produces 500 to 600 pounds of pellets per hour after the startup period. These large prior art machines require motors of up to 20 horsepower or more to operate in order to produce the above amounts of pellets. Such prior art machines are heavy, unwieldly stationary units and have not become economically feasible or sufficiently effective for fire fighting and pollution control. The structure of the present invention may weigh approximately 60–100 pounds or less, is less than 3 feet high and approximately 12 inches wide and 6 inches deep and utilizes a small motor of less than 1 horsepower and is capable of being highly mobile and produces about 800 pounds of carbon dioxide pellets per hour with a startup time of only about 3 seconds. This enables the present invention to be a very important and less expensive fire fighting apparatus.

Carbon dioxide in solid form has a very limited shelf life, even under refrigeration. Thus, it cannot be produced beforehand and inventoried for future fire and pollution control or other uses. However, with the present invention, this drawback is eliminated in view of its ability to produce a high volume of carbon dioxide pellets with a very short startup time. For example, because of the small size and weight of the invention and speed of production of "on the spot" carbon dioxide pellets, the invention or several units thereof could be mounted in a helicopter along with a tank of compressed carbon dioxide liquid to form an effective delivery system for $CO_2$ pellets to fight forest fires. Alternatively, a large unit may be stationarily positioned at a site remote from a fire site and the $CO_2$ pellets transported and discharged at a desired location at the fire site by a large bucket or similar container carried by a helicopter. The invention could also be used to extinguish large chemical fires, fires in high rise buildings and fires which cannot be reached by other conventional means. This invention also enables various utility and chemical plants to quickly suppress deadly chemical spills and neutralize harmful vapors such as ammonia vapor and the like. The invention, due to its small and lightweight characteristics, could be mounted on a small trailer, pickup truck or other truck or even on a man's back for portable fire and pollution control use. Even if fire is on a surface of the water such as an oil or fuel fire which floats on water, this invention will solve the problem as the pellets will float on water and extinguish the fire.

In addition, the invention is not restricted to fire fighting since various well known problems can be solved by instantaneous freezing or congealing of liquids into a solid mass with the solid mass then being quickly recovered and recycled before serious harm is caused to personnel or the environment. The present invention is particularly useful in association with oil tankers, cargo ships, offshore oil drilling platforms, petrochemical plants, petroleum refining plants and in many other varied locations where fires, oil spills release of toxic materials may occur.

The foregoing is considered as illustrative only of the principles of the invention. Further, since numerous modifications and changes will readily occur to t hose skilled in the art, it is not desired to limit the invention to the exact construction and operation shown and described, and, accordingly, all suitable modifications and equivalents may be resorted to, falling within the scope of the invention.

What is claimed as new is as follows:

1. An apparatus for producing solid carbon dioxide pellets comprising a housing having a partial cylindrical inner surface, a cylindrical rotor journalled adjacent said housing for rotation about an axis eccentric to the center axis of said partial cylindrical inner surface of the housing, a liquid $CO_2$ supply and expansion assembly communicated with said housing and rotor and receiving liquid carbon dioxide from a pressurized source, permitting the liquid $CO_2$ to convert to a gaseous and snow phase and discharging snow onto the rotor and venting said gaseous carbon dioxide, said rotor including a plurality of radially movable blades extending between the rotor and the partial cylindrical inner surface of the housing to form a plurality of pockets receiving snow from the supply and expansion assembly whereby rotation of the rotor about its eccentric axis will move said pockets and snow circumferentially and reduce the volume of the pockets to compress the snow into pellets, said housing including a discharge area associated with the pockets when they are at minimum volume for discharge of solid compacted pellets from the housing.

2. The apparatus as defined in claim 1, wherein said supply and expansion assembly includes a supply conduit for liquid carbon dioxide, an elongated manifold receiving the liquid carbon dioxide, a plurality of nozzles in the manifold for enabling discharge and expansion of the carbon dioxide, a plurality of generally square expansion tubes receiving expanding liquid carbon dioxide from the nozzles to form a mixture of gaseous carbon dioxide and snow particles, said square expansion tubes having discharge ends adjacent the rotor to evenly discharge snow particles into and throughout the area of the pockets formed by the blades on the rotor and enabling escape of gaseous carbon dioxide.

3. The apparatus as defined in claim 1 combined with an airlock receiving carbon dioxide pellets from the rotor housing, said airlock including a cylindrical housing, a rotor in said cylindrical housing and being rotatable about an axis coincidental with a center axis of said cylindrical housing, said rotor in the airlock including a plurality of blades extending radially and spring biased into engagement with the cylindrical housing to define upwardly open pockets receiving solid carbon dioxide pellets and conveying them in isolated pockets to a discharge area, and an air inlet and outlet at opposite ends of the airlock cylindrical housing in communication with isolated pockets at said discharge area to discharge pellets from the isolated pockets.

4. The apparatus as defined in claim 3, wherein said cylindrical housing includes an air discharge spaced from the pellet discharge area for discharging residual air from the pockets in the rotor in the cylindrical housing prior to the pockets becoming aligned with the solid pellet discharge from the pellet forming rotor.

5. The apparatus as defined in claim 1, wherein said housing includes opposed side walls, each side wall including a circular cavity having a center concentric with the center of the partial cylindrical inner surface and eccentric with the axis of rotation of the rotor, said blades having ends received in the cavities to maintain outer edges of the blades adjacent the partial cylindrical inner surface during rotation of the rotor to provide reduction in volume of pockets and compression of snow in the pockets as the rotor moves from a position with the pockets being sequentially aligned with the supply and expansion assembly where the pockets are of maximum volume to a position in alignment with the discharge area where the pockets are of minimum volume and the snow particles in each are compacted into a pellet.

6. The apparatus as defined in claim 5, wherein each blade includes a plurality of longitudinally spaced parallel slots extending to an outer edge thereof, said partial cylindrical housing including a plurality of spaced parallel dividers on said inner surface, said dividers extending into said slots in the blades to cut the pellet in each pocket into a plurality of generally equal sized pellets as the blades, pockets and snow move circumferentially along the partial cylindrical inner surface of the housing.

7. The apparatus as defined in claim 6, wherein each divider is arcuate in configuration and includes an outer edge received in grooves coincident with the inner surface of said partial cylindrical surface and an inner edge coincident with the outer surface of said rotor.

8. The apparatus as defined in claim 7, wherein said housing includes a front wall and a rear wall, each of said dividers having a lower end aligned with an inner surface of an upper end of said rear wall, said partial cylindrical housing having a lower end connected to and aligned with an inner surface of an upper end of said rear wall, said partial cylindrical housing terminating in an upper edge less than 180° from the lower end to expose an upper portion of the rotor and coact with the rotor blades to form upwardly opening pockets to receive snow particles from the supply and expansion assembly.

9. The apparatus as defined in claim 8, wherein said front wall includes an inner surface oriented closely adjacent the path of movement of the outer edges of the blades when moving upwardly toward the supply and expansion assembly, said front wall including a plurality of spaced parallel fins on its inner surface and extending into the slots in the blades to prevent movement of snow from the supply and expansion assembly downwardly past the rotor into the discharge area.

10. The apparatus as defined in claim 9, wherein at least one of said side walls includes an air inlet aligned with a closed pocket containing a solid $CO_2$ pellet as the closed pocket passes the lower end of the partial cylindrical housing, said air inlet adapted to receive pressurized air at a velocity to dislodge solid $CO_2$ pellets from the pockets as they pass the lower end of the dividers and partial cylindrical housing and discharging said pellets to an airlock.

11. The apparatus as defined in claim 10, wherein said front wall of the housing includes a gas collection chamber on the forward surface, said gas collection chamber forming a closure for an upper end portion of said housing walls to collect all gaseous $CO_2$ discharged from the supply and expansion assembly, said gas collection chamber including a vent located through a wall of said gas collection chamber.

12. The apparatus as defined in claim 11, wherein said supply and expansion assembly extends upwardly in included angular relation to the rotor and housing to reduce the size of the apparatus and enhance aggregation of smaller snow particles into larger snowflakes for gravity discharge into upwardly opening pockets between adjacent blades on the rotor.

13. The apparatus as defined in claim 12, wherein said upwardly opening pockets defined by adjacent blades when extending upwardly from the rotor define continuous pockets with continuous wall surfaces, said square tubes having lower ends configured to discharge snow into all areas of each upwardly opening pocket.

14. The apparatus as defined in claim 13 combined with an airlock receiving carbon dioxide pellets from the rotor housing, said airlock including a cylindrical housing, a rotor in said cylindrical housing and being rotatable about an axis coincidental with a center axis of said cylindrical housing, said rotor in the airlock including a plurality of blades extending radially and spring biased into engagement with the cylindrical housing to define upwardly opening pockets receiving solid carbon dioxide pellets and conveying them in isolated pockets to a discharge area, and an air inlet and outlet at opposite ends of the airlock cylindrical housing in communication with isolated pockets at said discharge area to discharge pellets from the isolated pockets.

15. The apparatus as defined in claim 14, wherein said cylindrical housing includes an air discharge spaced from the pellet discharge area for discharging residual air from the pockets in the rotor in the cylindrical housing prior to the pockets becoming aligned with the solid pellet discharge from the pellet forming rotor.

16. The apparatus as defined in claim 8, wherein said partial cylindrical housing includes a stopper strip extending across and closing lower ends of said grooves and forming an abutment for that portion of the lower end of each divider received in said grooves.

17. The apparatus as defined in claim 6, wherein each divider includes a beveled upper end extending radially throughout the depth of each slot in each blade to cut the pellet in each pocket into smaller pellets.

18. The apparatus as defined in claim 1, wherein said supply and expansion assembly includes a nozzle extending through a side wall of said housing, said nozzle communicating with a source of pressurized $CO_2$ and enabling expansion into said pockets as snow for compression into pellets and discharge from the housing.

19. An apparatus for compressing compressible material as the material is moved circumferentially comprising a housing having at least a partial cylindrical inner surface having a center axis, a cylindrical rotor driven rotatably about an axis spaced from the center axis of said partial cylindrical inner surface, said rotor including a plurality of radial slots, a radially moving blade in each slot coacting with the rotor and partial cylindrical surface to form radial pockets to receive compressible material at an inlet area as the pockets are aligned with the inlet area and compressing the material as the material in the pockets is moved circumferentially and compressed as the pockets reduce in volume toward a discharge area at an end of said partial cylindrical housing closer to the rotational axis of said rotor than the end of said pockets adjacent the inlet area thereby eliminating extrusion of compressible material radially through orifices.

20. The apparatus as defined in claim 19, wherein each of said blades includes a plurality of slots extending to an outer edge thereof, said partial cylindrical surface including a plurality of arcuate blockers each having an inner edge received in one of said slots to stop $CO_2$ gas from escaping through said blade slots.

21. The apparatus as defined in claim 20, wherein said housing includes side walls, each side wall having a circular cavity in an inner surface thereof, each of said blades having end edges guidingly received in said cavities, said cavities having a center axis coincidental to the center axis of said partial cylindrical surface to move said blades radially in relation to the rotor as the rotor is rotated about said axis spaced from the center axis of said cavities and partial cylindrical inner surface of said housing.

22. The apparatus as defined in claim 19, wherein said housing includes a cutter blade extending toward said rotor at said discharge area for removing compressed material from said pockets.

23. An apparatus for compressing compressible material as the material is moved circumferentially comprising a housing having at least a partial cylindrical inner surface having a center axis, a cylindrical rotor driven rotatably about an axis coincident from the center axis of said partial cylindrical inner surface, said rotor including a plurality of radial slots, a radially moving blade in each slot coacting with the rotor and partial cylindrical surface to form radial pockets to receive compressible material at an inlet area as the pockets are aligned with the inlet area, said housing including a surface in eccentric relation to and closer to the rotational axis of said rotor than the cylindrical surface for compressing the material into pellets as the material in the pockets and the pockets are reduced in volume as the pockets move along the eccentric surface toward a discharge area in said housing in spaced relation to said inlet area for discharge of compressed pellets by gravity.

24. The apparatus as defined in claim 23, wherein said inlet area includes a nozzle through which liquid $CO_2$ passes and expands to form snow particles aggregated in said pockets, when the blades are engaged with the partial cylindrical surface of said housing.

* * * * *